United States Patent [19]

Bresser et al.

[11] Patent Number: 5,433,767
[45] Date of Patent: Jul. 18, 1995

[54] DIRECT REDUCTION OF IRON OXIDE MATERIALS WITH SOLID CARBONACEOUS REDUCING AGENTS

[75] Inventors: Wolfgang Bresser, Grossostheim; Martin Hirsch, Friedrichsdorf; Bernd Kösters, Frankfurt am Main; Fritz Rose, Bad Homburg, all of Germany

[73] Assignee: Metallgesellschaft Aktiengesellschaft, Frankfurt am Main, Germany

[21] Appl. No.: 208,872

[22] Filed: Mar. 9, 1994

[30] Foreign Application Priority Data

Mar. 10, 1993 [DE] Germany .................. 43 07 484.7

[51] Int. Cl.6 .................... C22B 5/14; C21B 13/14
[52] U.S. Cl. ................................ 75/446; 75/450
[58] Field of Search ................. 75/444, 446, 450

[56] References Cited

U.S. PATENT DOCUMENTS 4,806,158 2/1989 Hirsch et al. .................. 75/446
5,185,032 2/1993 Whipp .......................... 266/172

Primary Examiner—Melvyn J. Andrews
Attorney, Agent, or Firm—Herbert Dubno

[57] ABSTRACT

In a first fluidized bed vessel containing an expanded fluidized bed, iron oxide-containing materials are reduced under weakly reducing conditions with solid carbonaceous reducing agents to or to less than the FeO state. In a second fluidized bed vessel containing an expanding fluidized bed the gas-solids suspension discharged from the first fluidized bed vessel is treated with a highly reducing fluidizing gas whereby the material is reduced in part to iron metal. From the gas-solid suspension discharged from the second fluidized bed vessel the carbonized carbonaceous material is separated and is recycled to the first fluidized bed vessel. The exhaust gas from which the carbonized carbonaceous material has been removed is purified and $CO_2$ is removed therefrom and the exhaust gas is subsequently fed as a fluidizing gas to the second fluidized bed vessel. A reduced material which has a degree of metallization from 50 to 80% and the remainder of the carbonized carbonaceous material are discharged from the second fluidized bed vessel and in a melting reactor are completely reduced and melted.

10 Claims, 2 Drawing Sheets

DIRECT REDUCTION OF IRON OXIDE MATERIALS WITH SOLID CARBONACEOUS REDUCING AGENTS

FIELD OF THE INVENTION

Our present invention relates to the direct reduction of iron oxide materials with solid carbonaceous reducing agents and, more particularly, to a process which utilizes fluidized bed.

BACKGROUND OF THE INVENTION

The direct reduction of iron oxide materials with solid carbonaceous reducing agents can reduce the materials containing iron oxide in a first fluidized bed vessel containing an expanded fluidized bed and supplied with solid carbonaceous reducing agents and fluidizing gas and operated under weekly reducing conditions with such a short residence time of the gas in the fluidized bed vessel that the reduction potential results in a reduction to FeO or to less than the FeO state. The gas-solids suspension discharged from the first fluidized bed vessel containing an expanded fluidized bed can be fed to a second fluidized bed vessel containing an expanded fluidized bed to which a highly reducing gas is fed as a fluidizing gas.

A strongly reducing exhaust gas and a major part of the resulting carbonized carbonaceous material can be discharged from the upper portion of the second fluidized bed. The carbonized carbonaceous material can be separated from said exhaust gas and recycled to the first fluidized bed vessel. The remaining exhaust gas can be purified and $CO_2$ can be removed therefrom and subsequently a part of the gas can be recycled as the highly reducing fluidizing gas to the second fluidized bed vessel.

Reduced material which has been metallized to a degree from 50 to 80% and the remainder of the carbonized carbonaceous material can be discharged from the lower portion of the second fluidized bed vessel. The carbonized carbonaceous material which is recycled to the first fluidized bed vessel is generally recycled at a rate which is a multiple of the rate at which the iron oxide-containing materials are charged to the first fluidized bed vessel. The heat content of the suspension passed from the first fluidized bed vessel to the second is usually sufficient to supply the second fluidized bed vessel with the heat required to be consumed therein.

In the winning of ores and the processing of relatively low grade iron ores, fine-grained ores become available in progressively increasing quantities. Such fine-grained ores can be directly reduced at temperatures below their melting temperature in special fluidized bed processes, which are carried out under highly favorable mass and heat transfer conditions.

In the direct reduction with solid carbonaceous reducing agents, the following different processes must consecutively be performed: Heating up of ore and coal, low-temperature carbonization of the coal, gasification of the coal, reduction of the ore and an optional cooling of the end product.

European Patent Publication 255,180 discloses the process described above for the direct reduction of fine-grained materials containing iron oxide in two fluidized bed vessels, which are connected in series. In preferred embodiments the inlet temperature of the suspension passing from the first fluidized bed vessel into the second is 30° to 80° C. above the temperature of the gas-solids suspension withdrawn from the upper portion of the second fluidized bed vessel and the carbonized carbonaceous material is circulated at a rate which is 10 to 50 times the rate at which the iron oxide-containing material is charged.

The carbonized carbonaceous material is separated from the material which has been discharged from the lower portion of the second fluidized bed vessel. At least part of the separated material is recycled to the first fluidized bed vessel. The iron oxide-containing material before being charged to the first fluidized bed vessel is preheated by the highly reducing gas from the second fluidized bed vessel.

The reduced material from the second fluidized bed vessel is completely reduced and melted in melting reactors and the exhaust gas from the melting reactors is fed as a highly reducing gas to the second fluidized bed vessel. Part of the separated carbonized carbonaceous material is charged to the melting reactor.

That process affords the advantage that hot spots and encrustation particularly at the nozzles for supplying oxygen-containing gases, will be avoided in the direct reduction with solid carbonaceous reducing agents in fluidized beds and that the reduction in the fluidized beds can be effected without disturbance.

There is virtually no metallic iron in the first fluidized bed vessel, which is supplied with oxygen-containing gases to produce the required heat. As a result, a reoxidation of iron metal and hot spots at the nozzles are avoided.

Such reoxidation and hot spots will also be avoided in the second fluidized bed vessel, which is not supplied with oxygen-containing gases. A recycling of iron metal from the second fluidized bed vessel to the first fluidized bed vessel will also be avoided.

OBJECTS OF THE INVENTION

It is the principal object of the invention to provide an improved process for the direct reduction of iron-oxide-containing materials with solid carbonaceous reducing agents whereby drawbacks of earlier approaches are avoided and the energy efficiency of the process is increased.

Another object of the invention is to provide a process of the aforedescribed type which, however, can minimize the requirement for primary energy in the direct reduction process, permits the process to be carried out as a thermally self-sufficient process or with a supply of low-grade extraneous heat, such as low-pressure steam, and avoids a production of surplus energy in the process.

It is also an object to provide such a process in which the quality of the resulting product is improved.

SUMMARY OF THE INVENTION

These objects are attained, in accordance with the invention, in that the reduced material is completely reduced and melted in a melting reactor, the gas evolved from the molten material is afterburned directly above the molten material by a blowing of oxygen-containing gases having an oxygen content of at least 50% by volume onto the molten material to provide mixed gases containing 40 to 70% by volume $CO_2+H_2O$, calculated without nitrogen, the heat generated by the afterburning is substantially transferred to the molten material, and the partly mixed gases are completely afterburned afterburned by a second afterburning effected by a supply of oxygen-containing gases.

The expression "expanded fluidized bed" describes highly expanded fluidized beds, which are operated at a gas velocity in excess of the terminal settling velocity of the solid particles (the lowest velocity at which the solid particles are maintained in suspension).

An expanded bed is distinguished from an "orthodox" fluidized bed, in which a dense phase is separated by a distinct density step from the overlying gas space, in that there are states of distribution without a defined boundary layer. There is no density step between a dense phase and an overlying dust space but the solids concentration within the reactor continuously decreases from bottom to top. A gas-solids suspension is discharged from the top portion of the reactor. A definition of the operating conditions by the Froude and Archimedes numbers indicates the following ranges for the expanded bed:

$$0.1 \leq 3/4 \times Fr^2 \times \frac{\rho_g}{\rho_k - \rho_g} \leq 10$$

and $0.01 \leq Ar \leq 100$
wherein $$Ar = \frac{d_k^3 \times g(\rho_k - \rho_g)}{\rho_g \times d_k} \text{ and}$$

$$Fr^2 = \frac{u^2}{g \times d_k}$$

u = relative gas velocity in m/sec.
Ar = Archimedes number
Fr = Froude number
$\rho_g$ = density of the gas in kg/m$^3$
$\rho_k$ = density of the solid particle in kg/m$^3$
$d_k$ = diameter of the spherical particle in m
$\nu$ = kinematic viscosity in m$^2$/sec.
g = constant of gravitation in m/sec$^2$.

The carbonaceous material may consist of any coal from anthracite to lignite, carbonaceous minerals and waste products, such as oil shale, petroleum coke or washery refuse, which are solid at room temperature.

The oxygen-containing gas which is supplied to the first fluidized bed vessel preferably consists of oxygen or oxygen-enriched air.

The residence time of the gas in the first fluidized bed vessel is preferably about 0.5 to 3 seconds and is determined by the selected height of the reactor. Within the above-mentioned limits the residence time may also be adjusted by a control of the gas velocity. The residence time of the iron oxide-containing material in the first fluidized bed should be about 0.2 to 1.5.

The average solids content in the first fluidized bed vessel should be 100 to 300 kg/m$^2$ of the empty furnace space.

Gas which contains free oxygen is not fed to the second fluidized bed vessel. In the second fluidized bed vessel the residence time of the gas should exceed 3 seconds and the residence time of the iron oxide-containing material should be about 15 to 40 minutes. For this reason the second reactor is taller than the first.

The mean solids content in the lower portion of the second fluidized bed vessel below the inlet for the gas-solids suspension from the first fluidized bed vessel should be 30 to 600 kg/m$^2$ of the empty furnace space and the mean solids content in the upper portion of the second fluidized bed vessel should be 50 to 200 kg/m$^2$.

The gas-solids suspension is preferably fed into the second fluidized bed vessel on a level which is at least 1 meter above the inlet for the highly reducing fluidizing gas up to a height which is up to 30% of the height of the furnace.

If the foregoing operating conditions are adopted the carbonized carbonaceous material and the reduced iron-containing material will be effectively separated in the second fluidized bed vessel.

The heat required in the second reactor is supplied by the gas-solids suspension from the first reactor and most of said heat is supplied by the carbonized carbonaceous material serving as a heat carrier. For this reason the temperature in the first fluidized bed vessel is controlled to be in excess of the temperature of the gas-solids suspension leaving the second fluidized bed vessel.

The overheating which is required for that purpose in the first fluidized bed vessel depends on the rate at which the carbonized carbonaceous material is circulated. In dependence on the reactivity of the carbonaceous material the temperature in the fluidized bed vessels usually lies in the range from 850° to 1100° C.

The reduced product is withdrawn from the lower portion of the second fluidized bed vessel and is accompanied by a certain proportion of carbonized carbonaceous material.

The fluidized bed vessels may be operated under a pressure which is not substantially above atmospheric pressure or is up to 20 bars above the atmospheric pressure.

Part of the exhaust gas from the second fluidized bed vessel is withdrawn from circulation and is used as a fuel gas for reheating the circulating gas. The oxygen-containing gases are blown onto the molten material in order to afterburn the gases evolved from the molten material through nozzles which are arranged in the side wall of the melting reactor and which are preferably inclined toward the surface of the molten material so that the gas jets impinge on that surface.

More then 50% and preferably more than 70% of the heat generated by the first afterburning are transferred to the molten material. The second afterburning can be effected by a supply of air. The heat which is not transferred to the molten material is contained in the exhaust gas from the melting reactor and is preferably used for steam production. The resulting steam is desirably used to scrub off $CO_2$.

The advantages of this process resides in that the reducing system in the fluidized bed vessels and the system for the treatment in the melting reactor can be operated independently of each other as far as the gas streams are concerned. For this reason an optimum operation of both systems is possible. The entire heat which has been generated from the carbonaceous material is optimally utilized in the stems and there is no need for a delivery of surplus energy. The requirement for primary energy is kept at an optimum minimum.

In an embodiment of the invention the second afterburning is effected in the upper portion of the melting reactor by injected oxygen-containing gases. The oxygen-containing gases required for the second afterburning, particularly air, are so injected into the upper portion of the melting reactor that the complete second afterburning is effected there.

In an embodiment of the invention the second afterburning is effected outside the melting reactor in a succeeding combustion chamber.

Alternatively, the material discharged from the lower portion of the second fluidized bed vessel is charged to a third fluidized bed vessel, the exhaust gas from the second fluidized bed vessel is purified and $CO_2$ is removed therefrom and a part of the exhaust gas is subsequently fed as a fluidizing gas to the third fluidized bed vessel, the exhaust gas from the third fluidized bed vessel is fed as a secondary gas to the lower portion of the second fluidized bed vessel, the material discharged from the second fluidized bed vessel is further reduced in the third fluidized bed vessel to a metallization up to 95%, and the reduced material is withdrawn from the third fluidized bed vessel.

Of the fluidizing gas which is recycled after $CO_2$ has been scrubbed off, about 10 to 20% is fed to the first fluidized bed vessel, 35 to 60% to the second fluidized bed vessel, and 25 to 45% to the third fluidized bed vessel. The lower portion of the second fluidized bed vessel receives the exhaust gas from the third fluidized bed vessel as a secondary gas and has a height amounting to up to 30% of the total height of the second fluidized bed reactor.

In addition to the advantage described hereinbefore this mode of the process affords the advantage that the reduction under highly reducing conditions is effected in two stages so that the counterflow operation results in a substantially higher utilization of the reducing gases. A higher metallization is achieved and the utilization of the gases is not decreased.

According to a further feature the reduced material from the third fluidized bed vessel is completely reduced and melted in a melting reactor, the gas evolved from the molten material is afterburned directly above the molten material with oxygen-containing gases which contain at least 50% by volume oxygen blown onto the molten material to provide mixed gases containing 40 to 70% by volume $CO_2+H_2O$, calculated without nitrogen, the heat generated by the afterburning is substantially transferred to the molten material, and the partly afterburned mixed gases are completely afterburned by being supplied with oxygen-containing gases in a second afterburning.

Advantageously the second afterburning is carried out in the upper portion of the melting reactor by injected oxygen-containing gases.

Alternatively second afterburning is effected outside the melting reactor.

Surplus carbonized carbonaceous material can be removed by a high-temperature separation from the reduced material which has been discharged from the lower portion of the second fluidized bed vessel, the carbon content of the remaining reduced material is controlled not to exceed 5% by weight, and the reduced material is then compacted in a hot state. The high-temperature separation may be effected by sieving, pneumatic separation or magnetic separation and is effected at a temperature between 60° C. and 800° C. Compacting may be effected by briquetting or by the rolling to form a strip with subsequent disintegration. Shaped members having a high stability are produced. The shaped bodies may be sold or may be melted, e.g. in electric furnaces.

The process in another mode can have the surplus carbonaceous material removed by sieving at high temperature from the reduced material which has been discharged from the lower portion of the second fluidized bed vessel, the carbon content of the remaining reduced material being controlled not to exceed 5% by weigh, and the reduced material being then compacted in a hot state.

That processing affords the advantage that a product is obtained which has improved properties for its further processing. Besides, it is much more suitable for being transported or stored because a risk of reoxidation of dusting is avoided.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
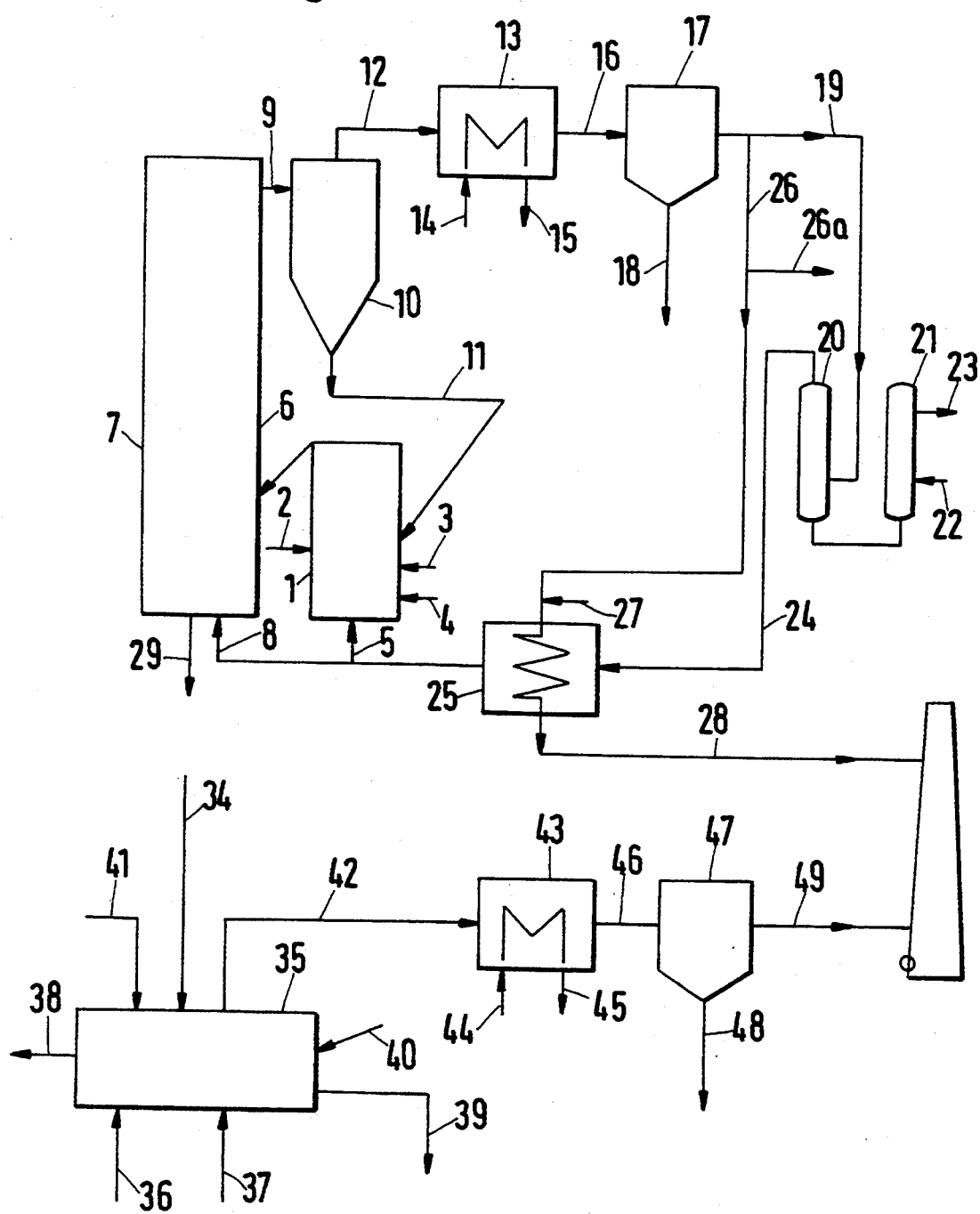
FIG. 1 is a flow diagram of a processing in two fluidized bed vessels and a succeeding melting reactor for effecting a reduction in a molten state and an afterburning.

In accordance with the drawings, ore is fed through line 2 to the first fluidized bed vessel 1. The ore has been preheated in suspension-type heat exchangers, not shown. Coal, oxygen and fluidizing gas are fed to the first fluidized bed vessel 1 through lines 3, 4, and 5, respectively. The second fluidized bed vessel 7 is fed with the gas-solids suspension from the top of the first fluidized bed vessel 1 through line 6 and with the fluidizing gas through line 8. A gas-solids suspension which contains a large proportion of carbonized carbonaceous material is fed from the top of the second fluidized bed vessel through line 9 to the separating cyclone 10.

The solids which have been separated by the cyclone 10 are recycled through line 11 to the fluidized bed vessel 1. The exhaust gas leaving the separating cyclone 10 is passed through line 12 and suspension-type heat exchangers, which are not shown and are used to preheat the ore. Water is fed through line 14 to the waste heat boiler 13, from which the steam is withdrawn through line 15. The cooled exhaust gas from the waste heat boiler 13 is fed through line 16 to a gas purifier 17, from which the separated dust is withdrawn through line 18 and the purified exhaust gas is withdrawn through line 19. $CO_2$ is removed from the exhaust gas in a $CO_2$ scrubber 20. Upstream of the $CO_2$-scrubber, the gas may be cooled (in a heat exchanger not shown) to condense water vapor.

The $CO_2$ absorbed by the scrubbing liquor is driven out in the desorber 21, which is fed with steam through line 22 and from which the $CO_2$ is withdrawn through line 23. The connection between the scrubber 20 and the desorbers 21 is only schematically indicated. The highly reducing gas from which $CO_2$ has been removed is fed through line 24 to the reheater 25, which is fed through line 26 with a partial stream of the exhaust gas from line 19 and through line 27 with combustion air. A partial stream of the gas from line 26 is fed through line 26a to an oxygen generator, not shown.

The highly reduced gas which has been reheated is fed through lines 5 and 8 as a fluidizing gas to the fluidized bed vessels 1 and 7. The combustion gases from the reheater 25 are conducted through line 28 into the chimney. Reduced material and part of the carbonized carbonaceous materials are withdrawn through 29 from the fluidized bed vessel 7.

Figure 2:
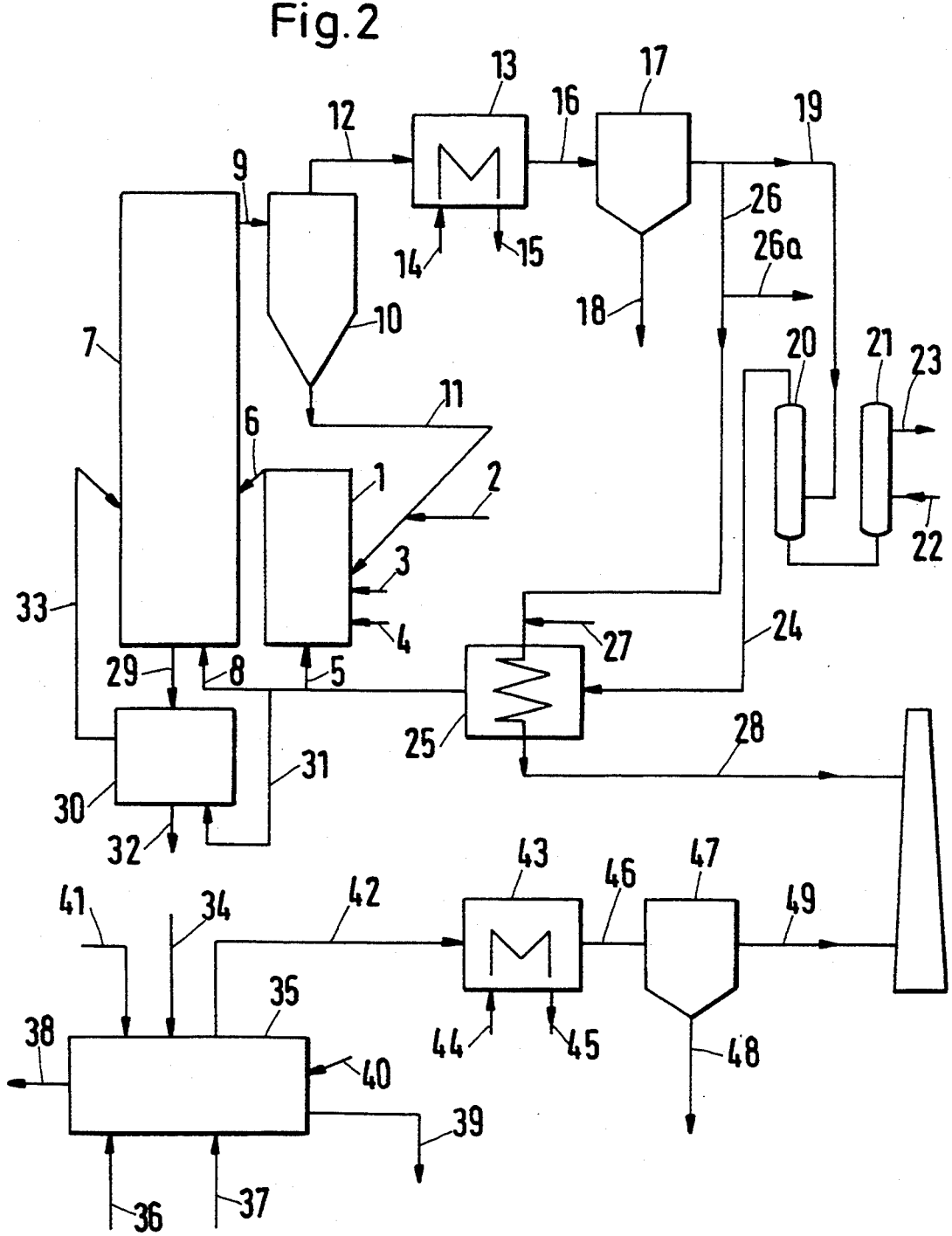
FIG. 2 is a flow diagram of a processing in three fluidized bed vessels and a succeeding melting reactor for effecting a reduction in a molten state and an afterburning.

In the system of FIG. 2 the reduced material from the second fluidized bed vessel 7 is fed to the third fluidized bed vessel 30, which is fed through line 31 with a highly reducing gas as a fluidizing gas. The material which has been reduced further is withdrawn through line 32. The exhaust gas is fed through line 33 as a secondary gas to the second fluidized bed vessel 7.

According to FIG. 1 the reduced material which has been withdrawn through line 29 and according to FIG. 2 the material which has been reduced further and withdrawn through line 32 is charged through line 34 to the melting reactor 35. From the bottom of the melting reactor 35, oxygen is blown through nozzles 36 and 37 into the molten material. Slag is withdrawn through 38 and liquid iron through 39. Oxygen is blown onto the surface of the molten material through nozzles 40, which are inclined to said surface to effect the first afterburning of the gas evolved from the bath. For a second afterburning, air is blown through nozzles 41 into the upper portion of the melting reactor. The exhaust gas is fed through line 42 to the heat exchanger 43, which is fed with water through line 44 and from which steam is withdrawn through line 45. The cooled exhaust gas from the heat exchanger 43 is fed through line 46 to the gas purifier 47, from which the separated dust is withdrawn through 48. The purified exhaust gas is conducted through line 49 into the chimney.

EXAMPLE

The reference numbers relate to FIG. 2.

An iron ore is preheated to 820° C. in two stages in suspension-type heat exchangers.

Item 2: Ore, 78,400 kg/h

Item 29: Ore prereduced to a degree of reduction of 75%, 58,200 kg/h Carbonized coal at 950° C., 5,900 kg/h Item 38: Slag having a CaO/SiO$_2$ ratio of 1.2, 6,3000 kg/h Item 39: Hot metal containing 2.4% C and at 1550° C., 52,100 kg/h Item 3: Coal containing 1% H$_2$O, particle size <5 mm, 27,500 kg/h Item 4: Oxygen, 99.5% O$_2$, 10,300 sm$^3$ (standard cubic meters) per hour Item 12: Mixed gases consisting of 47% CO, 19% CO$_2$, 18% H$_2$, 13% H$_2$O, 0.5% CH$_4$, 3% N$_2$, at 560° C., 101,000 sm$^3$/h Item 19: 75,200 sm$^3$/h Item 26: 15,400 sm$^3$/h Item 5: Gas containing 1% CO$_2$, at 750° C., 8,000 sm$^3$/h Item 8: Gas containing 1% CO$_2$, at 750° C., 31,800 sm$^3$/h Item 31: Gas containing 1% CO$_2$, at 750° C., 20,000 sm$^3$/h Item 35: Oxygen containing 99.5% O$_2$, 5,800 sm$^3$/h First afterburning:

$$\frac{CO_2}{(CO = CO_2)} = 50\%$$

Item 41: Air, 15,000 sm$^3$/h

Item 42: Exhaust gas 17,000 sm$^3$/h

Item 15: Steam at 5 bars, 24,000 kg/h

Item 45: Steam at 5 bars, 36,000 kg/h

Item 22: Steam at 5 bars, 61,000 kg/h

Item 23: CO$_2$, 15,200 sm$^3$/h

We claim:

1. A process for the direct reduction of iron oxide-containing materials with solid carbonaceous reducing agents, comprising the steps of:
   (a) reducing the iron oxide-containing materials in a first fluidized bed vessel containing an expanded fluidized bed and supplied with solid carbonaceous reducing agents and fluidizing gas and operated under weakly reducing conditions and with such a short residence time of the gas in the fluidized bed vessel such that a reduction potential results therein in a reduction to at most an FeO state;
   (b) feeding a gas-solids suspension discharged from the first fluidized bed vessel to a second fluidized bed vessel reducing gas as a fluidizing gas, an exhaust gas and a major part of carbonized carbonaceous material resulting in said second fluidized bed being discharged from an upper portion of the second fluidized bed;
   (c) separating the carbonized carbonaceous material from said exhaust gas and recycling separated carbonized carbonaceous material to the first fluidized bed vessel, the separated exhaust gas being purified and CO$_2$ being removed therefrom and subsequently recycling a part of said purified exhaust gas as highly reducing fluidizing gas to the second fluidized bed vessel;
   (d) discharging reduced material which has been metallized to a degree from 50 to 80% and a remainder of the carbonized carbonaceous material together from a lower portion of the second fluidized bed vessel, the carbonized carbonaceous material which is recycled to the first fluidized bed vessel being recycled at a rate which is a multiple of the rate at which the iron oxide-containing materials are charged to the first fluidized bed vessel, and the heat content of the suspension passed from the first fluidized bed vessel to the second vessel being sufficient to supply the second fluidized bed vessel with the heat required to be consumed therein;
   (e) completely reducing and melting the discharged reduced material in a melting reactor to form a molten material;
   (f) afterburning gas evolved from the molten material contained in said melting reactor, directly above the molten material, by a blowing of oxygen-containing gases having an oxygen content of at least 50% by volume onto the molten material to provide partly afterburned mixed gases containing 40 to 70% by volume CO$_2$+H$_2$O, calculated without nitrogen, heat generated by the afterburning being substantially transferred to the molten material; and
   (g) completely afterburning the partly afterburned mixed gases by a second afterburning effected by a supply of oxygen-containing gases.

2. The process according to claim 1 wherein the second afterburning is effected in the upper portion of the melting reactor by injected oxygen-containing gases.

3. The process according to claim 2 wherein the second afterburning is effected outside the melting reactor.

4. A process for the direct reduction of iron oxide-containing materials with solid carbonaceous reducing agents, comprising the steps of:

(a) reducing the iron oxide-containing materials in a first fluidized bed vessel containing an expanded fluidized bed and supplied with solid carbonaceous reducing agents and fluidizing gas and operated under weakly reducing conditions and with such a residence time of the gas in the fluidized bed vessel such that a reduction potential results therein in a reduction to at most an FeO state;

(b) feeding a gas-solids suspension discharged from the first fluidized bed vessel to a second fluidized bed vessel containing an expanded fluidized bed supplied with a highly reducing gas as a fluidizing gas, an exhaust gas and a major part of carbonized carbonaceous material resulting in said second fluidized bed being discharged from an upper portion of the second fluidized bed;

(c) separating the carbonized carbonaceous material from said exhaust gas and recycling separated carbonized carbonaceous material to the first fluidized bed vessel, the separated exhaust gas being purified and $CO_2$ being removed therefrom and subsequently recycling a part of said purified exhaust gas as highly reducing fluidizing gas to the second fluidized bed vessel;

(d) discharging reduced material which has been metallized to a degree from 50 to 80% and a remainder of the carbonized carbonaceous material together from a lower portion of the second fluidized bed vessel, the carbonized carbonaceous material which is recycled to the first fluidized bed vessel being recycled at a rate which is a multiple of the rate at which the iron oxide-containing materials are charged to the first fluidized bed vessel, and the heat content of the suspension passed from the first fluidized bed vessel to the second vessel being sufficient to supply the second fluidized bed vessel with the heat required to be consumed therein;

(e) charging the material discharged from the lower portion of the second fluidized bed vessel to a third fluidized bed vessel;

(f) purifying exhaust gas from the second fluidized bed vessel removing $CO_2$ therefrom, and feeding a part of said purified exhaust gas as a fluidizing gas to the third fluidized bed vessel;

(g) feeding an exhaust gas from the third fluidized bed vessel as a secondary gas to a lower portion of the second fluidized bed vessel;

(h) further reducing the material discharged from the second fluidized bed vessel in the third fluidized bed vessel to a metallization up to 95%; and (i) withdrawing a reduced material from the third fluidized bed vessel.

5. The process according to claim 4 wherein reduced material from the third fluidized bed vessel is completely reduced and melted, in a melting reactor to form a molten material, the gas evolved from the molten material is afterburned directly above the molten material in that oxygen-containing gases which contain at least 50% by volume oxygen are blown onto the molten material to provide mixed gases containing 40 to 70% by volume $CO_2+H_2O$ calculated without nitrogen, the heat generated by the afterburning is substantially transferred to the molten material, and the partly afterburned mixed gases are completely afterburned by being supplied with oxygen-containing gases in a second afterburning.

6. The process according to claim 5 wherein the second afterburning is effected in the upper portion of the melting reactor by injected oxygen-containing gases.

7. The process according to claim 5 wherein the second afterburning is effected outside the melting reactor.

8. The process according to claim 4 wherein surplus carbonized carbonaceous material is removed by a high-temperature separation from the reduced material which has been discharged from the lower portion of the second fluidized bed vessel, the carbon content of the remaining reduced material is controlled not to exceed 5% by weight, and the reduced material is then compacted in a hot state.

9. A process for the direct reduction of iron oxide-containing materials with solid carbonaceous reducing agents, comprising the steps of:

(a) reducing the iron oxide-containing materials in a first fluidized bed vessel containing an expanded fluidized bed and supplied with solid carbonaceous reducing agents and fluidizing gas and operated under weakly reducing conditions and with such a residence time of the gas in the fluidized bed vessel such that a reduction potential results therein in a reduction to at most an FeO state;

(b) feeding a gas-solids suspension discharged from the first fluidized bed vessel to a second fluidized bed vessel containing an expanded fluidized bed supplied with a highly reducing gas as a fluidizing gas, an exhaust gas and a major part of carbonized carbonaceous material resulting in said second fluidized bed being discharged from an upper portion of the second fluidized bed;

(c) separating the carbonized carbonaceous material from said exhaust gas and recycling separated carbonized carbonaceous material to the first fluidized bed vessel, the separated exhaust gas being purified and $CO_2$ being removed therefrom and subsequently recycling a part of said purified exhaust gas as highly reducing fluidizing gas to the second fluidized bed vessel;

(d) discharging reduced material which has been metallized to a degree from 50 to 80% and a remainder of the carbonized carbonaceous material together from a lower portion of the second fluidized bed vessel, the carbonized carbonaceous material which is recycled to the first fluidized bed vessel being recycled at a rate which is a multiple of the rate at which the iron oxide-containing materials are charged to the first fluidized bed vessel, and the heat content of the suspension passed from the first fluidized bed vessel to the second vessel being sufficient to supply the second fluidized bed vessel with the heat required to be consumed therein;

(e) separating surplus carbonaceous material at high temperature from the reduced material discharged from a lower portion of the second fluidized bed vessel;

(f) following step (e) controlling carbon content of the reduced material not to exceed 5% by weight; and (g) then compacting the reduced material in a hot state.

10. The process according to claim 9, step (f), wherein the carbon content of the reduced material is controlled not to exceed 5% by weight by charging the reduced material withdrawn from a lower portion of the second fluidized bed vessel into a third fluidized bed vessel into which is fed a highly reducing gas as a fluidizing gas, and withdrawing from the third fluidized bed vessel the reduced material with a carbon content not to exceed 5% by weight.

* * * * *

UNITED STATES PATENT AND TRADEMARK OFFICE
CERTIFICATE OF CORRECTION

PATENT NO. : 5,433,767
DATED : 18 July 1995
INVENTOR(S) : Wolfgang Bresser; Martin Hirsch; Bernd Kösters and Fritz Rose It is certified that error appears in the above-identified patent and that said Letters Patent is hereby corrected as shown below:

Claim 1, line 14, (col. 8, line 18) for the text therepresent read:

-- bed vessel containing an expanded fluidized bed supplied with a highly reducing gas as a fluidizing gas, an ex - --;

Signed and Sealed this

Seventeenth Day of December, 1996

Attest:

BRUCE LEHMAN

*Attesting Officer*  *Commissioner of Patents and Trademarks*